Sept. 8, 1953
W. H. CLARK ET AL
2,651,385
SHIMMY DAMPENER
Filed April 18, 1950
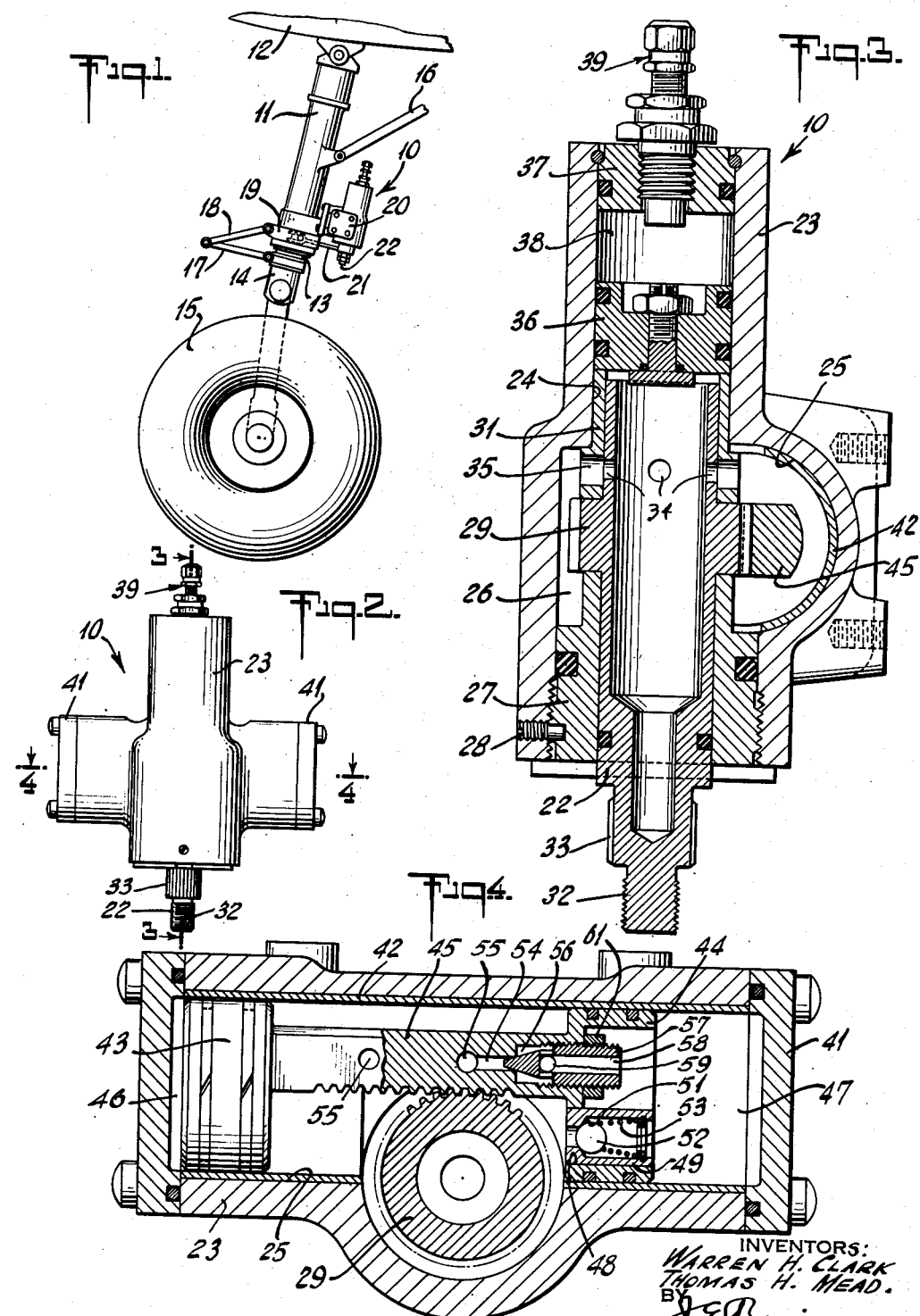
INVENTORS:
WARREN H. CLARK
THOMAS H. MEAD.
BY J E Beringer
their ATTORNEY.

Patented Sept. 8, 1953

2,651,385

UNITED STATES PATENT OFFICE 2,651,385

SHIMMY DAMPENER

Warren H. Clark, Glendale, and Thomas H. Mead, Los Angeles, Calif., assignors to United Aircraft Products, Inc., Dayton, Ohio, a corporation of Ohio Application April 18, 1950, Serial No. 156,704

3 Claims. (Cl. 188—88)

This invention relates to shock absorbing devices, especially those associated with the nose wheels of aircraft to inhibit shimmy effects.

It is an object of the invention to provide a compact, self-contained shimmy dampener adapted to installation in a variety of landing gear assemblies.

Another object of the invention is to provide for a dissipation of torque impulses through hydraulic flow restriction.

A further object of the invention is to enable easy adjustment of the flow restriction.

Still another object is to provide for automatic thermal and leakage compensation in the device.

A still further object is to present a device of the kind described which is readily adaptable to mass production in various sizes and strokes of movement and which is simply maintained and serviced.

Other objects and structural details of the invention will appear from the following description when read in connection with the accompanying drawing, wherein:

Fig. 1 is a view in side elevation of an aircraft nose wheel assembly incorporating a shimmy dampener in accordance with the instant invention;

Fig. 2 is a view of the shimmy dampener in front elevation;

Fig. 3 is a view in vertical longitudinal section, taken substantially along the line 3—3 of Fig. 2, and enlarged with respect thereto; and Fig. 4 is a view in horizontal longitudinal section, taken substantially along the line 4—4 of Fig. 2, and enlarged with respect thereto.

Referring to Fig. 1 of the drawing, a shimmy dampener in accordance with the instant invention is shown, indicated at 10, in one type of installation to which it is adapted. According to this installation, which deals with an aircraft nose wheel, a cylinder strut 11 is connected to an aircraft body 12 for swinging motion in a longitudinal direction. The strut 11 receives a plunger 13 and incorporates suitable means for damping axial thrusts of the plunger. On the outer projecting end of the plunger 13 is mounted a yoke 14 carrying the nose wheel 15. When landing, the strut 11 and wheel 15 are held, in about the position shown, by a link 16 which is also operative to draw the assembly into a retracted position during flight. The vertical shocks of landing and taxying imposed upon the nose wheel are sustained and absorbed within the strut 11. Shimmy and castering movements of the wheel are absorbed by an auxiliary shock absorber, such as the device 10 hereof which, as shown, is made fast to a bracket 20 on the strut 11. In communicating torque impulses from the wheel to the dampener 10 any suitable linkage may be used, for example, that illustrated wherein links 17 and 18 connect the yoke 14 to a collar 19 loosely mounted on the strut 11. The collar 19 is in turn connected, by means including a link 21 to a shaft 22 projecting from the dampener 10. According to the construction and arrangement of parts a swivelling motion of the nose wheel 15 is transmitted through the described linkage to shaft 22 which tends to rotate in a corresponding direction.

Considering now the structural details of the shimmy dampener, it comprises, as shown in Figs. 2, 3 and 4, an approximately T shaped body 23 presenting intersecting through bores 24 and 25. The bore 24 is counterbored at one end thereof to define a chamber 26 receiving a bushing 27. The base of the bushing 27 is screw threaded into the body 23 and is further keyed thereto by a radial set screw 28. The inner projecting end of the bushing 27 is reduced in diameter and abuts an annular flange 29 on the shaft 22, the flange 29 having a toothed formation to act as pinion. The shaft 22 has a rotatable mounting in the bushing 27 and in a complementary bushing 31 which abuts the opposite side of the flange 29 and seats in the top of chamber 26, with a skirted part of the bushing 31 being received in the bore 24 beyond chamber 26. The shaft projects through and beyond the outer end of the bushing 27 and its end is formed with a threaded surface 32 and a serrated surface 33. The surface 33 is so formed for positive gripping engagement with the motion transmitting linkage while surface 32 is adapted to mount a retaining nut or the like.

The interior of the shaft 22 is partly bored out to serve as a reservoir for hydraulic fluid, such reservoir communicating through radial ports 34 in the shaft and registering ports 35 in bushing 31 with the chamber 26. Beyond the open inner end of the shaft 22 is a piston 36 reciprocably mounted in the bore 24. That end of bore 24 adjacent piston 36 is closed by a removable wall 37 defining, with the piston 36, a pressure chamber 38. A valve 39 is mounted in the wall 37 and provides a means of admitting compressed air to the chamber 38, furnishing a yielding force urging the piston 36 downward or in a direction to exert pressure upon hydraulic fluid contained in the spaces below it.

The bore 25 is offset from the longitudinal plane of bore 24 but intersects bore 24, communicating directly with chamber 26. The opposite ends of the bore 25 are closed by caps 41, and there is mounted within the bore a cylinder liner 42 cut away at its mid portion to allow the assembly comprising shaft 22, bushing 27 and bushing 31 to project into bore 25. Reciprocably mounted within the cylinder liner 42 is a pair of pistons 43 and 44 spaced apart and rigidly interconnected by a rod 45 which may be integrally formed therewith. The position of the piston assembly is such as to place rod 45 in overlying relation to the flange 29 on shaft 22 and there is formed on the rod gear teeth meshing with the teeth on flange 29. The relationship between the rod 45 and flange 29 thus is that of a rack and pinion, translating rotary motion of the shaft 22 into an axial or longitudinal motion of the piston assembly and precluding any appreciable relative movement therebetween.

The spaces between the respective pistons 43 and 44 and end caps 41 constitute pressure chambers 46 and 47. Such chambers, as well as the space between the pistons, are normally filled with hydraulic fluid. Motion of the piston assembly in this closed pressure fluid system is accomplished by providing each piston 43 and 44 with valved and restricted fluid passages. Since such passages and the controls therefor are the same for each piston only those associated with piston 44 will be described. The piston is hollow and in the vertical base wall thereof is an opening 48 mounting a bushing 49. The central passage through bushing 49 presents a valve seat 51 facing chamber 47. A ball valve 52 is pressed upon seat 51 by a spring 53. A check valve arrangement thus is provided preventing flow out of chamber 47 but permitting flow into the chamber in response to a pressure differential exceeding the force of spring 53. Flow out of chamber 47 is permitted by way of a longitudinal bore 54 in rod 45 terminating in a transverse bore 55 opening into the space between the pistons. The pressure fluid in chamber 47 reaches bore 54 by way of a counterbore 56 providing a screw threaded mounting for a needle restrictor 57. The restrictor 57 has axial and transverse bores 58 and 59 communicating chamber 47 with counterbore 56 for a flow of fluid to escape bores 54 and 55. The tapered front end of the restrictor is received in bore 54 and defines therewith an annular orifice, the area of which can be varied by screwing the restrictor more deeply into counterbore 56 or backing it farther out. A lock nut 61 on the shank of the restrictor provides a means of maintaining a set position of adjustment against the effects of vibration.

In the operation of the device, and assuming chamber 38 to be filled with compressed air and the remaining open spaces to be filled with hydraulic fluid, a rotative impulse applied to shaft 22 is resolved by pinion 29 and rack 45 into an axial impulse applied to pistons 43 and 44 in a corresponding direction. Assuming that the direction of applied impulses is to the right, as viewed in Fig. 4, fluid in chamber 47 will be forced past restrictor elements 57 through bores 54 and 55 to the center space between the pistons. The excess fluid in the center chamber will be admitted past the check valve 52 in piston 43 to chamber 46 which increases in volume in response to the described motion of the piston assembly. A reverse impulse will result in a reverse operation of the piston assembly, with, however, all spaces being filled with hydraulic fluid as before. Energy to be dissipated is accounted for by flow past the restrictor elements 57 which may be adjusted for a greater or lesser restriction to flow, as circumstances may require.

It will be recognized that piston 36 and chamber 38 operate as an accumulator, supplying hydraulic fluid under pressure to the space between the pistons 43 and 44. Leakage is compensated for by replacement fluid drawn from the reservoir represented by chamber 26 and the hollow interior of shaft 22. Thermal expansion is provided for in the floating mounting of piston 36 and the compressibility of the medium in chamber 38. Expansion within the chambers 46 and 47 can be relieved through the restricted bores 54.

Specific reference has not been made to various seals provided to restrict leakage from the unit. In illustrating the seals, cast iron or phenolic rings have been shown on the pistons 43 and 44. Synthetic rubber rings are not required here since a slight leakage around these pistons will not affect the operation of the unit.

What is claimed is:

1. A shimmy dampener or like device, comprising a body presenting a pair of intersecting bores, a rotatable shaft received in one of said bores and projecting from one end thereof, a hydraulic accumulator in the opposite end of said one bore, resilient means applying a continuous pressure to the fluid in said hydraulic accumulator, a passageway communicating said hydraulic accumulator with the other of said bores, a piston assembly reciprocably mounted in said other bore and including a pair of spaced apart pistons of equal diameter and an interconnecting piston rod, means for effecting a controlled restricted flow of pressure fluid between the opposite ends of each of said pistons in response to longitudinal impulses applied to said piston assembly whereby to damp such impulses, and a rack and pinion connection between said shaft and said piston rod to utilize the damping function of said piston assembly to absorb torque impulses applied through said shaft.

2. A shimmy dampener or like device comprising a body presenting a longitudinal bore, a rotatable tubular shaft received in said bore and projecting through one end thereof, the projecting end of said shaft being closed, a piston reciprocably mounted in said bore adjacent the opposite end thereof and defining in said end an air pressure chamber, means for admitting compressed air to said chamber to provide a yielding force urging said piston inward, hydraulic fluid filling said bore and the interior of said shaft inwardly of said piston and maintained under pressure by said piston, another bore in said body substantially at right angles to the first said bore, radial ports in said shaft communicating with the second said bore, said second bore being likewise filled with hydraulic fluid under pressure, reciprocable piston means in said second bore, hydraulic fluid flow restrictions in said piston means damping the movements thereof, and a rack and pinion connection between said rotatable shaft and said piston means.

3. A shimmy dampener or like device according to claim 2 characterized in that said piston means includes a piston assembly comprising a pair of spaced apart pistons defining pressure chambers at the opposite ends thereof and a rod rigidly interconnecting said pistons, check valve controlled openings in said pistons for admitting hydraulic fluid to said pressure chambers, and restricted orifices in said pistons for the escape of hydraulic fluid from said pressure chambers, said rack and pinion connection comprising a rack formed on said piston rod and a pinion formed on said shaft.

WARREN H. CLARK.
THOMAS H. MEAD.

References Cited in the file of this patent

UNITED STATES PATENTS

| Number | Name | Date |
|---|---|---|
| 1,367,866 | Cubbison | Feb. 8, 1921 |
| 1,953,128 | Peteler | Apr. 3, 1934 |
| 2,169,335 | Best | Aug. 15, 1939 |
| 2,393,110 | Kops et al. | Jan. 15, 1946 |

FOREIGN PATENTS

| Number | Country | Date |
|---|---|---|
| 361,521 | Great Britain | Nov. 26, 1931 |
| 481,569 | Great Britain | Oct. 13, 1937 |